No. 12,429. REISSUED JAN. 2, 1906.

G. E. ROLLINS.

WELT MAKING MACHINE.

APPLICATION FILED JULY 12, 1905.

2 SHEETS—SHEET 1.

Witnesses:

Walter H. Naylor.

M. A. Jones.

Inventor:

George E. Rollins, by Geo. H. Maxwell.

Attorney.

No. 12,429. REISSUED JAN. 2, 1906.

G. E. ROLLINS.

WELT MAKING MACHINE.

APPLICATION FILED JULY 12, 1905.

2 SHEETS—SHEET 2.

Witnesses:

Walter H. Naylor

M. A. Jones.

Inventor:

George E. Rollins, by Geo. H. Maxwell,

Attorney.

UNITED STATES PATENT OFFICE.

GEORGE E. ROLLINS, OF EAST BRIDGEWATER, MASSACHUSETTS.

WELT-MAKING MACHINE.

No. 12,429. Specification of Reissued Letters Patent. Reissued Jan. 2, 1906.

Original No. 748,794, dated January 5, 1904. Application for reissue filed July 12, 1905. Serial No. 269,417.

*To all whom it may concern:*

Be it known that I, GEORGE E. ROLLINS, of East Bridgewater, county of Plymouth, State of Massachusetts, have invented an Improvement in Welt-Making Machines, of which the following description, in connection with the accompanying drawings, is a specification, like letters on the drawings representing like parts.

My invention is a machine for quickly and accurately preparing welt-strips for Goodyear work and other uses requiring welting.

The constructional details and various advantages of my invention will be pointed out in the following description, reference being had to the accompanying drawings, in which I have illustrated a preferred embodiment of my invention, which will be more particularly defined in the appended claims.

Figure 1:
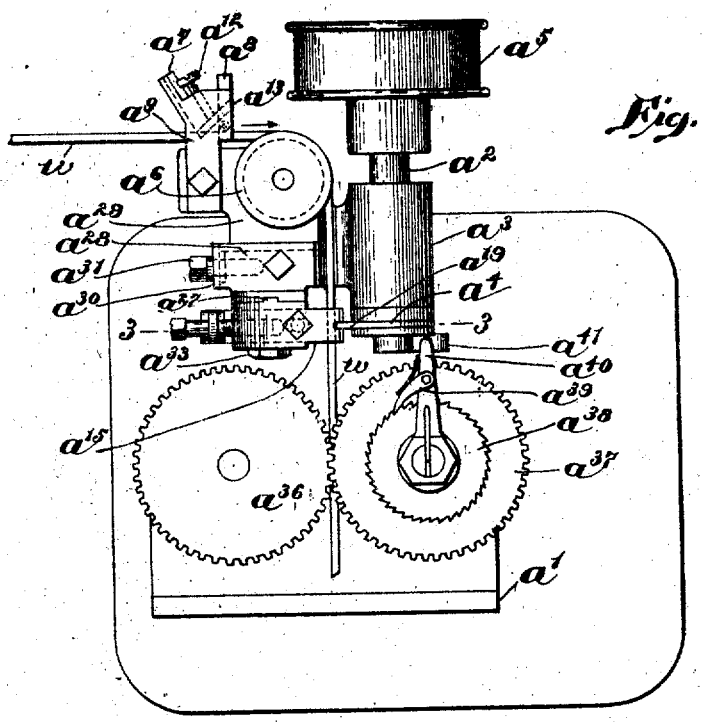
Figure 2:
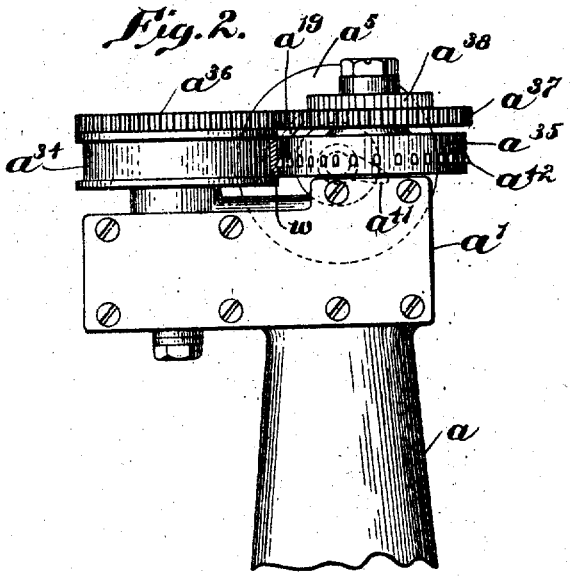
Figure 3:
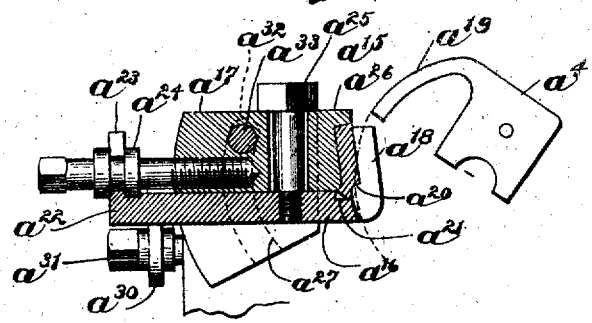
Figure 4:
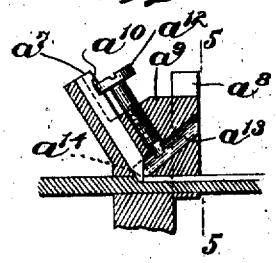
Figure 5:
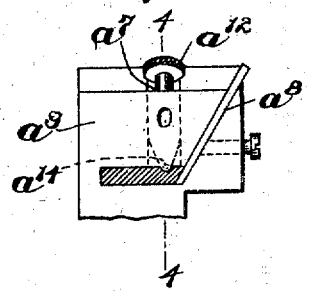
Figure 6:
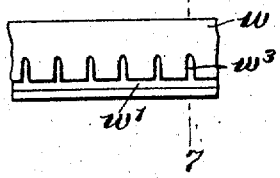
Figure 7:
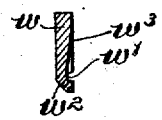

In the drawings, Figure 1 is a top plan view of one form of my invention. Fig. 2 shows the same in front elevation. Figs. 3 to 5 are enlarged sectional details taken on the lines 3 3, Fig. 1, 4 4, Fig. 5, and 5 5, Fig. 4, respectively. Fig. 6 is a fragmentary detail and top plan of a portion of the welt cut by this machine; and Fig. 7 is a transverse sectional view thereof on the dotted line 7 7, Fig. 6.

Mounted on any suitable base $a$ and table $a'$ is a drive-shaft $a^2$, journaled in a standard $a^3$ and provided with a rotary cutter $a^4$ at one end and a drive-pulley $a^5$ at the other end. Adjacent said shaft is a guide-pulley $a^6$, about which the welt-strip $w$ may pass for accurate guidance, and adjacent thereto are preliminary cutters $a^7$ $a^8$ for cutting, respectively, a longitudinal groove $w'$ and an opposite beveled edge $w^2$ on the strip $w$. These knives are mounted in a casting or other suitable holder $a^9$, as shown in detail in Figs. 4 and 5, the knife-blade $a^7$ being notched at $a^{10}$ for engagement with the head of an adjusting-screw $a^{12}$ for regulating the depth of cut of the knife. Opposite the cutting end of said knife is an opening $a^{13}$ to receive the cut-out portion of stock removed from the groove $w'$, which passes through an eye or hole $a^{14}$ in the end of said knife. The knife $a^8$ is arranged at the proper angle required for the bevel $w^2$. Opposite the rotary cutter $a^4$ I provide a welt-guide $a^{15}$, capable of adjustment toward and from said cutter and angularly up and down for enabling the machine to vary the depth and length of the transverse cuts in the welt made by the rotary cutter according to the purpose for which the welt is to be used. This holder comprises two parts $a^{16}$ $a^{17}$, the former having an upturned end slotted at $a^{18}$ and a deflecting portion consisting of a member $a^{20}$, shown as a rib or horizontal bead for entering the groove $w'$ in the welt-strip, and adjacent to said member a pocket $a^{21}$ to receive the lower edge of the welt-strip as it is turned back out of the way of the cutter end or knife $a^{19}$ by the rib $a^{20}$. The part $a^{16}$ extends rearwardly at $a^{22}$, where it is provided with an upturned end $a^{23}$, engaged by an adjusting-screw $a^{24}$, working in the part $a^{17}$ for adjusting the welt-receiving opening to fit different thicknesses of welt. The said two parts are clamped together vertically by a bolt $a^{25}$, the part $a^{17}$ preferably having an overhanging end $a^{26}$ for retaining the upper edge of the welt and also having a curved rib $a^{27}$, fitting into a corresponding groove in a carrier-block $a^{28}$, mounted on a stationary support $a^{29}$, herein shown as a part of the same casting which provides the standard $a^3$. The carrier $a^{28}$ has a depending end $a^{30}$, engaged by an adjusting-bolt $a^{31}$ for adjusting the same out and in, and thereby correspondingly adjusting the holder $a^{15}$ out and in. The carrier $a^{28}$ has an elongated slot $a^{32}$ (shown in dotted lines, Fig. 3) for receiving a set-screw $a^{33}$ from the holder for clamping the latter at the angle of adjustment desired. Beyond the three cutters I provide suitable feeding mechanism, herein shown as comprising a guide-wheel $a^{34}$ and opposite driving-wheel $a^{35}$, operated, respectively, by gears $a^{36}$ $a^{37}$, to the latter of which is secured a ratchet $a^{38}$, operated by a spring-controlled pawl $a^{39}$, whose arm $a^{40}$ is engaged at proper intervals by a lug $a^{41}$ on the shaft $a^2$, thereby ratcheting the feed-rolls forward after each cut, so as to bring the welt in proper position for the next cut.

In operation the welt-strip $w$ as it is fed forward by the feeding mechanism is cut by the knives $a^7$ $a^8$ at the points $w'$ $w^2$ and is held taut between its bent portion at the guide-pulley $a^6$ and the feed-wheels $a^{34}$ $a^{35}$ under even tension, so that as the continually-rotating cutter $a^4$ engages said strip it is enabled to make a clean cut exactly as required, the welt-strip being held firmly between the jaws of the holder and sustained by the bifurcated upturned end, so as to prevent any ragged or improper cut. As each vertical or transverse cut is made the welt is fed forward one step through the unchanging passage fitting the same and formed between the jaws or parts $a^{16}$ $a^{17}$ of the holder, the wheel $a^{35}$ being provided with a plurality of projecting portions $a^{42}$, which engage the vertical notches $w^3$ already cut in the welt and prevent the welt from slipping. The length of cut $w^3$ may be increased to any extent desired simply by rocking the holder so as to cause the cutter to enter the leather higher up than shown, and the depth of the cut may be varied by moving said holder toward the cutter, while the shape of the cut depends upon whether the welt-strip is maintained flat in its cut portion or is curved by the holder. By bending the lower edge of the welt back, as shown, not only is the leather brought under tension for enabling the cutter to operate to the best advantage, but the notches $w^3$ (or whatever form of cut or incision the particular knife $a^{19}$ used may make) are confined to the upper portion of the welt, as shown in Fig. 6, whereas by not bending the welt cut so far back said notches can be made to extend farther, if desired.

It will be understood that my invention is not restricted to the constructional details shown, as many variations in form, arrangement, and combination of parts may be resorted to without departing from the spirit and scope of my invention. For instance, it is obvious that by varying the shape or angle of the knife $a^{19}$ the shape of the cut $w^3$ will be varied, the essential feature being merely that the transverse cuts, whether simply incisions or otherwise, shall be accurately controlled as to depth and length, so as to leave a smooth uncut outer edge and exposed side to the welt.

I do not here claim the welt itself, as that forms the subject-matter of my Patent No. 747,642 of December 22, 1903, my present invention consisting of a machine to make said welt. This welt is characterized chiefly by the fact that one side has a series of transverse cuts or incisions terminating short of the edges and not entirely incising or cutting through the welt. The welt is made flexible and yielding by a series of transverse cuts which fall short of the outer edge of the welt and do not pass through the welt.

Having described my invention, what I claim as new, and desire to secure by Letters Patent, is—

1. A machine of the kind described, comprising means for feeding a welt-strip, means for holding said welt-strip, means coöperating therewith for making a transverse cut in one face of said strip, and means for limiting the length of the transverse cut in the strip to fall short of the outer edge of the strip.

2. A machine of the kind described, comprising means for feeding a welt-strip, and automatic cutting mechanism for making a series of transverse cuts in one side of said welt, less in depth than the thickness of the welt and stopping short of the outer edge of the strip.

3. A machine of the kind described, comprising means for feeding a welt-strip, a holder for the strip, and cutting mechanism for removing the leather therefrom to form a series of grooves within and extending transversely of one face of said strip, and means for rocking said holder for controlling the length of the groove with relation to the width of the strip.

4. In a machine of the kind described, a holder for a welt-strip, a cutter coöperating therewith for cutting said strip, said holder having a passage conforming in shape and size to the welt-strip and substantially embracing the strip, said passage being adjustable for different thicknesses of strips.

5. In a machine of the kind described, a holder for a welt-strip, a cutter coöperating therewith for removing transverse grooves of material from one face of said strip less in length than the width of the strip, and means for varying the depth of the grooves formed.

6. In a machine of the kind described, a holder for a welt-strip, a cutter having a blade acting intermittently on and transversely cutting said strip on one side at intervals of its length, and means for varying the angular position of said holder with relation to said cutter to change the length of the cuts.

7. In a machine of the kind described, a holder for a welt-strip, a cutter coöperating therewith for cutting said strip, said holder substantially embracing the strip, and means for varying the angular position of said holder with relation to said cutter.

8. In a machine of the kind described, a holder for a welt-strip, a cutter coöperating therewith for cutting said strip, said holder containing means for bending said welt-strip transversely to its length.

9. In a machine of the kind described, a holder for a welt-strip, a cutter coöperating therewith for cutting said strip, said holder being adjustable for different thicknesses of strips, and also adjustable toward and from said cutter.

10. A machine of the kind described, comprising a cutter, for cutting a welt-strip and means for bending said strip opposite said cutter in a direction transverse to its length.

11. In a machine of the kind described, a holder for a welt-strip comprising opposite parts for substantially embracing said strip, one of said parts having a deflecting device for engaging the welt on one side and bending the adjacent edge thereof out of line with the rest of the welt.

12. In a machine of the kind described, a holder for a welt-strip comprising two parts and means for adjusting the same toward and from each other for different thicknesses of strips, one part having a slotted portion for engaging the outer side of the welt, and a cutter for operating in said slot on said welt.

13. In a machine of the kind described, means for holding a welt-strip comprising a carrier, means for adjusting the same out and in, and a holder vertically adjustable on said carrier, said holder having an opening for the passage of the welt-strip.

14. A machine of the kind described, comprising a holder for a welt-strip, a cutter cooperating therewith for cutting transverse notches therein, and feeding mechanism for feeding the welt-strip, including a feed device having projections spaced apart to correspond with the notches cut in the strip, said projections entering said notches and feeding the strip thereby.

15. A machine of the kind described, comprising feeding mechanism, a cutter for making a series of transverse cuts in a welt-strip, cutting mechanism for longitudinally cutting said strip, and directing means for presenting said strip in different directions to said respective cutting devices.

16. In a machine of the kind described, a holder for a welt-strip, a cutter coöperating therewith for making transverse cuts in one face of said strip, and means for varying the length of the cuts.

17. In a machine of the kind described, a holder for a welt-strip, a cutter coöperating therewith for making transverse cuts in one face of said strip, and means for varying the location of said cuts toward and from the edge of said strip.

18. A machine of the kind described, comprising means for cutting a longitudinal groove in a welt-strip, and means for cutting a series of transverse cuts intersecting said longitudinal groove.

19. A machine of the kind described, comprising means for feeding a welt-strip, and means for longitudinally grooving said welt-strip, combined with automatic cutting means for simultaneously cutting transversely into the welt partially through from one side thereof.

20. A machine of the kind described, comprising means for feeding a welt-strip, and three coöperating cutters for simultaneously cutting respectively a longitudinal groove, a beveled edge, and a series of transverse cuts stopping short of the outer edge of the welt.

In testimony whereof I have signed my name to this specification in the presence of two subscribing witnesses.

GEORGE E. ROLLINS.

Witnesses:
SEWELL P. HOWARD,
HELEN F. JONES.